(12) United States Patent
Halfmann et al.

(10) Patent No.: US 11,641,154 B2
(45) Date of Patent: May 2, 2023

(54) POWER CONVERTER ASSEMBLY WITH A LINE-COMMUTATED POWER CONVERTER AND METHOD FOR STARTING UP THE ASSEMBLY

(71) Applicant: Siemens Energy Global GmbH & Co. KG, Munich (DE)

(72) Inventors: Ulrich Halfmann, Langensendelbach (DE); Stefan Hammer, Erlangen (DE); Volker Hussennether, Nuremberg (DE); Sascha Siegert, Schwarzenbruck (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 115 days.

(21) Appl. No.: 17/323,296

(22) Filed: May 18, 2021

(65) Prior Publication Data
US 2021/0359615 A1    Nov. 18, 2021

(30) Foreign Application Priority Data
May 18, 2020    (EP) .................................... 20175137

(51) Int. Cl.
*H02M 1/00*    (2006.01)
*H02M 1/36*    (2007.01)
(Continued)

(52) U.S. Cl.
CPC ........... *H02M 1/0095* (2021.05); *H02M 1/36* (2013.01); *H02M 7/4835* (2021.05); *H02M 7/521* (2013.01)

(58) Field of Classification Search
CPC .... H02M 1/0095; H02M 1/36; H02M 7/4835; H02M 7/521; H02M 7/7575; H02J 3/36
See application file for complete search history.

(56) References Cited

U.S. PATENT DOCUMENTS 11,349,384 B2 *   5/2022   Barupati ............... H02M 7/483
2016/0211667 A1   7/2016   Knaak et al.
(Continued)

FOREIGN PATENT DOCUMENTS

DE    102013214693 A1    1/2015
EP         3439158 A1    2/2019
(Continued)

OTHER PUBLICATIONS

Unknown: "Performance of unified power flow controller (UPFC) in electric power systems"; IEC TR 63262:2019; IEC, 3; Rue De Varembe, PO Box 131; CH-1211 Geneva 20, Switzerland; Sep. 13, 2019 (Sep. 13, 2019); pp. 1-40; XP082018625; Gefunden im Internet: URL:ftp://standard.iec.ch/iectr63262ed1.0en.pdf [gefunden am Sep. 13, 2019].

(Continued)

*Primary Examiner* — Fred E Finch, III
(74) *Attorney, Agent, or Firm* — Laurence A. Greenberg; Werner H. Stemer; Ralph E. Locher

(57) ABSTRACT

A converter arrangement has a line-commutated converter with an AC voltage terminal to be connected to an AC voltage grid via at least one phase line. The converter arrangement has at least one switching module branch that is arranged in series in the at least one phase line and that includes a series connection of switching modules at whose terminals bipolar voltages that sum to give a branch voltage are in each case able to be generated. A bypass branch is arranged in a parallel connection to the switching module branch. At least one switching device is arranged in the bypass branch. The switching device includes activatable semiconductor switches that are connected in antiparallel. There is also described a method for starting up the converter arrangement.

13 Claims, 4 Drawing Sheets

(51) Int. Cl.
  *H02M 7/483*     (2007.01)
  *H02M 7/521*     (2006.01)

(56) References Cited

U.S. PATENT DOCUMENTS

| | | | | |
|---|---|---|---|---|
| 2017/0302189 | A1* | 10/2017 | Jakob | H02M 1/088 |
| 2018/0076735 | A1* | 3/2018 | Bakran | H02H 7/1222 |
| 2019/0013662 | A1* | 1/2019 | Norrga | H02H 3/021 |
| 2020/0052611 | A1* | 2/2020 | Zhang | H02M 7/5155 |
| 2020/0403407 | A1 | 12/2020 | Endres et al. | |
| 2022/0085731 | A1* | 3/2022 | Mohanaveeramani | H02M 7/49 |

FOREIGN PATENT DOCUMENTS

| | | |
|---|---|---|
| EP | 3518366 A2 | 7/2019 |
| EP | 3614553 A1 | 2/2020 |
| WO | WO2019166082 A1 | 9/2019 |
| WO | WO2020043304 A1 | 3/2020 |

OTHER PUBLICATIONS

Bakas Panagiotis et al.: "Hybrid Topologies for Series and Shunt Compensation of the Line-Commutated Converter"; IEEE, 8th International Power Electronics and Motion Control Conference (IPEMC-ECCE Asia); 2016; May 22, 2016; pp. 3030-3035; XP032924766; 2016.

Lesnicar A. et al: "An innovative modular multilevel converter topology suitable for a wide power range"; 2003 IEEE Bologna Power Tech Conference Proceedings; vol. 3; Jan. 1, 2003 (Jan. 1, 2003), pp. 272-277; XP055079911.

Visser A J et al: "Direct-coupled cascaded mutlilevel sag compensator"; Power Electronics Specialists Conference; 2000. PESC 00. 2000 IEEE 31st Annual Jun. 18-23, 2000; Piscataway, NJ, USA,IEEE; vol. 1; Jun. 18, 2000; pp. 463-469; XP010517279.

* cited by examiner

POWER CONVERTER ASSEMBLY WITH A LINE-COMMUTATED POWER CONVERTER AND METHOD FOR STARTING UP THE ASSEMBLY

CROSS-REFERENCE TO RELATED APPLICATION

This application claims the priority, under 35 U.S.C. § 119, of European patent application EP 20175137.7, filed May 18, 2020; the prior application is herewith incorporated by reference in its entirety.

BACKGROUND OF THE INVENTION

Field of the Invention

The invention relates to a converter arrangement that comprises a line-commutated converter that has an AC voltage terminal that is able to be connected to an AC voltage grid via at least one phase line, wherein the converter arrangement furthermore comprises at least one switching module branch that is arranged in series in the at least one phase line and that comprises a series connection of switching modules at whose terminals bipolar voltages that sum to give a branch voltage are in each case able to be generated.

Line-commutated converters are known from the prior art. They are distinguished in particular in that the connected AC voltage grid brings about a changeover of the converter valves (also referred to as commutation). The semiconductor switches used in the line-commutated converter are often either passive elements, such as diodes, or activatable but not actively deactivatable semiconductor switches, such as for example thyristors. The advantage of line-commutated converters is primarily their robustness, reliability, relatively easy handling and control and the option of designing line-commutated converters for particularly high voltages.

Line-commutated converters are used in some applications in connection with a weak or unstable AC voltage grid. In such applications, the case may occur whereby an AC voltage provided by the AC voltage grid (or voltage time area), due to transient processes, is smaller than that which is required for the commutation of the converter. Such transient processes may be for example the switching of an AC voltage filter or a change in the electric power drawn from the AC voltage grid (i.e., a so-called voltage dip). This may lead to commutation faults and other problems during operation, or even to interruption of operation. A further challenge in connection with line-commutated converters is the high reactive power demand thereof. Fundamental reactive power compensation of around half the active power is generally required. This disadvantageously also increases the overall system footprint.

In order to improve voltage stability in the case of weak grids, it is possible to combine the line-commutated converter with shunt compensation. In the case of very weak AC grids, the use of a rotating phase shifter is a further consideration.

An arrangement having a line-commutated converter and a controllable series capacitance is known from the article by Bakas et al. "Hybrid Topologies for Series and Shunt Compensation of the Line-commutated Converter", IEEE 2016. The series capacitance is in that case formed by full bridge switching modules that are incorporated in series into a phase line. In the known arrangement, provision is made in particular for "passive" use of the full bridge switching modules, in the case of which these serve only to introduce a fundamental voltage. Full bridge switching modules are distinguished in particular in that a bipolar voltage, that is to say both a positive and a negative switching module voltage, is able to be generated at their terminals. The contribution of the switching module voltage essentially corresponds to an energy storage unit voltage present at an energy storage unit of the full bridge switching module. The adjustable series capacitance may advantageously be used to compensate a line impedance between the converter and the connection point.

BRIEF SUMMARY OF THE INVENTION

It is accordingly an object of the invention to provide a converter arrangement which overcomes the above-mentioned disadvantages of the heretofore-known devices and methods of this general type and which provides for a converter of this type that is as efficient and reliable as possible.

With the above and other objects in view there is provided, in accordance with the invention, a converter arrangement, comprising:

a line-commutated converter having an AC voltage terminal for connection to an AC voltage grid via at least one phase line;

at least one switching module branch connected in series in said at least one phase line, said at least one switching module branch having a series connection of switching modules with terminals configured to generate bipolar voltages that sum to give a branch voltage;

a bypass branch connected in parallel with said at least one switching module branch, said bypass branch containing at least one switching device formed with activatable semiconductor switches that are connected in an antiparallel connection.

In other words, the objects of the invention are achieved by a converter arrangement that has a bypass branch arranged in a parallel connection to the switching module branch, at least one switching device being arranged in the bypass branch, wherein the switching device comprises activatable semiconductor switches that are connected in antiparallel. The activatable semiconductor switches are in particular controllable, that is to say for example able to be activated by way of a suitable control apparatus, and they may thus be put into a conductive state actively through a measure at the respective semiconductor switch. The semiconductor switches are connected in antiparallel when, in the presence of a defined forward or reverse direction, they are oriented opposite one another in the respective semiconductor switch pair.

One advantage of the invention is that the protective semiconductors of the switching device allow the switching modules to be dimensioned for a lower voltage range that is usually specified by stationary operation. It is thus possible to avoid over-dimensioning of the switching modules in order to achieve a sufficiently high reverse voltage in fault cases. This is necessary both in terms of effectiveness and in terms of costs, since a large number of series connections, that is to say the number of switching modules that are used in a switching module branch, means both high transmission losses and high investments.

A further advantage of the invention is that the switching device is able to be used for the controlled pre-charging of the energy storage units of the switching modules. Putting the switching modules into service specifically requires the energy storage units to be charged. The energy storage units can be charged from the AC voltage grid by way of the switching device in the bypass branch. It is thereby possible to dispense with providing separate pre-charging apparatuses.

Using the switching device in the bypass branch, it is possible to bypass the switching module branch without interrupting the load current. This results in advantages for the operation of the converter arrangement, for example for performing maintenance work independently of the main transmission and flexible activation and deactivation of the arrangement depending on further operational requirements.

For the bypass branch, use is suitably made of semiconductor switches that have a higher current-carrying capability than the current-carrying capability of the deactivatable semiconductor switches that are possibly used in the switching modules (for example transistors, such as IGBTs or the like). High short-circuit currents that occur can be controlled through fast commutation of the current to the bypass branch.

It is possible to indirectly monitor the state of charge of the energy storage units of the switching modules from the difference between the measured voltages at the two outer terminals of the switching module branch or switching module branches (these voltages may be denoted U1 and U2). When pre-charging the switching modules, this is advantageous because the voltage buildup of the energy storage units (usually capacitors) results directly from the sum voltage (branch voltage) measured as the difference between U1 and U2 ($\Delta U_{12}$). This method is more accurate than the one based on measuring the (relatively small) currents through the switching module branch. The difference $U_1$-$U_2$ ($\Delta U_{12}$) may be used as input value for coordination in the event of over-voltages. During stationary operation, this results in the possibility of using the measured voltages $U_1$ and $U_2$ as input variables for controlling the operating point of the switching module branches.

If the converter is connected to a three-phase or multiphase AC voltage grid, it may be advantageous, for each of the grid phases, to provide a respective arrangement of the parallel branches with the switching module branch and the bypass branch. The converter accordingly has an n-phase AC voltage terminal that is able to be connected to the AC voltage grid via n phase lines, wherein a switching module branch is arranged in series in each phase line, wherein a series connection of the switching modules is arranged in each switching module branch and a respective bypass branch having a respective switching device having semiconductor switches able to be activated in antiparallel is arranged in parallel with each of the switching module branches.

The switching modules are preferably full bridge switching modules. Other variants (some known from the prior art) are however also conceivable in this context, such as for example including half bridge switching modules in a simple or multiple parallel connection. The prior art furthermore also discloses other bipolar switching modules that are suitable depending on the application case, in particular those at whose terminals more than one positive and/or more than one negative voltage are able to be generated.

This results in a particularly reliable variant of the invention when the line-commutated converter is a thyristor-based converter. The thyristor-based converter may have a three-phase bridge circuit having six phase branches (for example in a 6-pulse configuration). Each phase branch in this case extends between one of the DC voltage poles of the converter and one of the AC voltage terminals. A series connection of thyristors is arranged in each phase branch. The number of thyristors in a phase branch is defined by the desired design of the converter. The converter arrangement, independently of the selection of the power semiconductor switches of the converter, may in particular be designed for a voltage of more than 100 kV, preferably more than 500 kV. In applications of line-commutated converters in the HVDC field, two 6-pulse converters connected in series on the DC side are preferably operated in a 12-pulse overall configuration. The properties described below for a 6-pulse converter are also always able to be transferred analogously to a 12-pulse converter.

According to one embodiment of the invention, a mechanical bypass switch is arranged in a parallel connection to the switching module branch and to the bypass branch.

According to one embodiment of the invention, a first inductance is arranged in the switching module branch. The first inductance advantageously limits a current rise, in fault cases, to the rise rate/gradient permissible for protecting the switching modules. An upper limit of the rise rate is defined by a duration, required by the protective system, until the fault current is commutated into the bypass branch.

According to a further embodiment of the invention, a second inductance is arranged in the bypass branch. The second inductance, together with the first inductance, limits a current rise in a commutation process between the switching module branch and the bypass branch to the highest values permissible for the semiconductors of the switching device. Since the first inductance opposes both the rise in the fault current and a current rise during commutation to the bypass branch, this may be used for optimization purposes when determining the first and the second inductance. The first and/or the second inductance may for example be in the form of at least one appropriate choke.

For the number Ah of antiparallel semiconductor switches in the bypass branch, it is appropriately the case that Ah≤As≤3*Ah, wherein As denotes the number of switching modules in the associated switching module branch. This number firstly avoids over-dimensioning and secondly provides reliable protection.

The converter arrangement expediently comprises a central actuation unit that is designed to activate the semiconductor switches in the bypass branch when a predetermined condition is present. The bypass protection of the switching module branch or of the switching modules is thus predefined by a defined voltage threshold. When the voltage threshold is reached, the semiconductors of the switching device are triggered by way of the central actuation unit and the switching modules are expediently blocked at the same time.

According to one embodiment of the invention, the semiconductor switches in the bypass branch are designed to be activated automatically or independently, that is to say without communication with a central actuation unit, when a predetermined condition is present. The selection of the number of series connections of the antiparallel semiconductor switches in the bypass branch in relation to the number of switching modules in the switching module branch may be tailored such that an automatic triggering unit integrated into the switching device triggers or brings about activation of the semiconductor switches of the switching device when a maximum permissible present switching module voltage is reached. One advantage of this variant is that the integrated triggering of the semiconductor switches guarantees protection of the switching modules, even without a central actuation unit. One possible criterion for the design is that the maximum permissible sum voltage (branch voltage) leads to the reaching of a BOD threshold ("break over diode" threshold) of the semiconductor switches in the bypass branch.

The converter arrangement preferably furthermore comprises a controllable transformer that is arranged between the at least one switching module branch and the converter. A controllable transformer in the context of the invention is in particular a transformer with a controllable transformation ratio. The controllable transformer may advantageously be used to compensate a voltage amplitude change (in particular an increase) that is caused by the additional series voltage placed on the switching module branch. It is thereby possible to prevent additional voltage loading of the converter or its valves (for example thyristor valves). A converter operating point (DC voltage, DC current, trigger angle, angle of overlap) may additionally advantageously remain independent of the operation of the switching modules. Using the controllable transformer furthermore allows existing line-commutated converters to be expanded with the switching module branch ("upgrade").

With the above and other objects in view there is also provided, in accordance with the invention, a method for starting or for starting up a converter arrangement according to the invention. The converter arrangement is usually started up or started following interruption of the operation of the converter arrangement, which results for example from an internal or external fault.

The object of the invention is to specify such a method that allows starting of the converter arrangement that is as reliable as possible.

The object is achieved according to the invention in a method of this type in that the switching modules in the switching branch are blocked, the semiconductor switches in the bypass branch are activated with a predetermined delay, and the branch current is commutated from the switching branch to the bypass branch through the delayed activation of the semiconductor switches.

The semiconductor switches in the bypass branch are suitably activated at defined times following the current zero crossing, wherein the defined times are characterized by a delay time between the current zero crossing and the activation of the semiconductor switches; the delay time is selected on the basis of the current value, wherein the delay time is selected to be smaller the higher the current (the delay time may in this case also be zero), a branch current is commutated from the bypass branch to the switching branch by actuating the semiconductor switches; the branch current commutates from the switching branch to the bypass branch through the delayed activation of the semiconductor switches following the current zero crossing of the branch current.

The switching modules are in this case preferably switched (independently) on the basis of a switching module voltage and a current direction of the branch current, such that the energy storage units of the switching modules are charged to a predefined voltage level. The semiconductor switches in the bypass branch may thereby in particular be used to pre-charge the energy storage units. The method advantageously allows the converter arrangement or the switching module branch to be started even when the converter arrangement is already operating, that is to say load current is flowing with usual operating values.

When the semiconductor switches in the bypass branch are activated, a mechanical bypass switch arranged in the parallel connection to the bypass branch is preferably opened, that is to say blocked for the current flow, such that the branch current is commutated to the bypass branch.

One preferred variant of the method according to the invention may be described as follows. In a first method step, the switching module branch is bypassed by way of the mechanical bypass switch, such that the load current flows through the mechanical bypass switch. In a second method step, the rapid bypassing by way of the switching device in the bypass branch (for example the antiparallel thyristors) is activated by way of one or more suitable activation signals. In a third method step, the mechanical bypass switch is opened; the load current commutates to the bypass branch; the switching modules are thereby blocked and their energy storage units are discharged. In a fourth method step, the activation signals to the activatable semiconductor switches are suspended, such that these are deactivated or blocked at a current zero crossing; the load current commutates to the switching module branch and charges the energy storage units (for example capacitors); the duration of the charging process is determined by the value of the load current and the capacitance and the desired target voltage to which the energy storage units should be charged. After a predetermined time, the semiconductor switches in the bypass branch are reactivated and the current commutates back to the bypass branch; the charging process is interrupted for the blocked switching modules. If the switching modules expediently do not report to a central actuation unit after a defined time, then it may be assumed that the pre-charging did not take place to a sufficient extent; in such a case, the abovementioned method steps may be repeated. The blocking time of the semiconductor switches in the bypass branch may in this case be reduced, for example by half, with each repetition. After reaching a high enough energy storage unit voltage and/or reporting of a sufficient number of switching modules, the switching modules appropriately transition to clocked operation in which bipolar voltages or a deactivated state are generated by way of switching the semiconductor switches of the switching modules. The sequence of the clocked operation may take place as follows. When the semiconductor switches in the bypass branch are activated, all of the switching modules are put into the deactivated state. The semiconductor switches in the bypass branch are put into the blocking state (in the absence of activation pulses, the semiconductor switches are blocked at a current zero crossing). By switching individual switching modules (or their semiconductor switches) into the states "positive output voltage" or "negative output voltage", the energy storage units reach a voltage range required for normal operation. After a sufficient number of switching modules are available for normal operation, the transition to normal operation takes place and the actual function of the switching modules is performed.

Another embodiment of the pre-charging consists, instead of the fourth method step, in actuating the semiconductor switches in the bypass branch in the phase section, that is to say the trigger delay angle of the activatable semiconductor switches (for example thyristors) is used such that only a (small) part of the current half-oscillations is commutated to the switching modules and the energy storage units of the switching modules are charged. This variant is advantageous in particular in the case of large charging currents. To this end, small trigger delay angles are used, such that the current starting from the current zero crossing initially flows through the switching modules and commutates to the switching modules with the activation delayed only by a few degrees. This achieves charging of the switching modules with a defined charging current. The current effective value may be regulated by the trigger delay angle. If allowed by the operating concept of the load, the load current may be kept small, for example by virtue of the semiconductor switches in the bypass branch being in no-load mode on the grid, and thus only the no-load current flows. The lowest load is defined for example by a thyristor converter with the connected HVDC, to which, in addition to the HVDC converter transformer in no-load mode, charging currents of the circuitry of the blocked thyristor valves also contribute.

Other features which are considered as characteristic for the invention are set forth in the appended claims.

Although the invention is illustrated and described herein as embodied in a power converter assembly with a line-commutated power converter and a method for starting up the assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
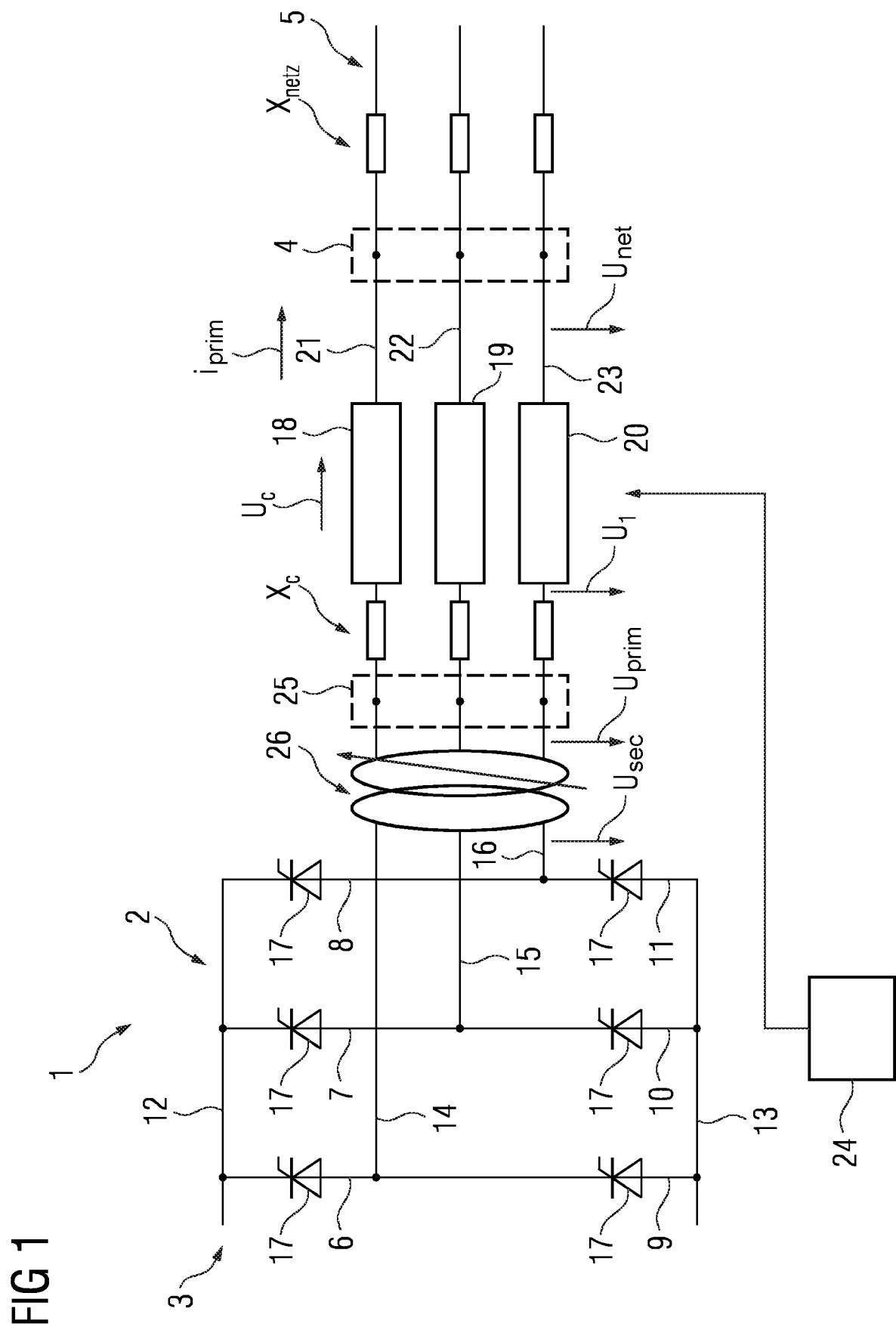
FIG. 1 shows a schematic illustration of an exemplary embodiment of a converter arrangement according to the invention.

Referring now to the figures of the drawing in detail and first, in particular, to FIG. 1 thereof, there is shown a converter arrangement 1 that is connected, at a grid connection point 4, to a three-phase AC voltage grid 5. The converter arrangement 1 comprises a line-commutated converter 2. The converter 2 has a DC voltage side that is connected to a DC voltage grid or DC voltage line 3. A controllable transformer 26 comprising a step switch is arranged on the AC voltage side of the converter 2. The converter 2 comprises six converter arms or converter valves 6-11 that each extend between one of the DC voltage poles 12 or 13 of the converter 2 and one of the three AC voltage terminals 14-16. A series connection of thyristors 17 is arranged in each of the converter arms 6-11. The converter 2 is connected to the AC voltage grid 5 by way of the AC voltage terminals 14-16 via three phase lines 21-23.

The converter arrangement 1 furthermore comprises a first switching module branch in a first arrangement of parallel branches 18, a second switching module branch in a second arrangement of parallel branches 19, and a third switching module branch in a third arrangement of parallel branches 20. The first branch arrangement 18 is introduced in series into a first phase line 21, the second branch arrangement 19 is introduced in series into a second phase line 22 and the third branch arrangement 20 is introduced in series into a third phase line 23. The three phase lines 21-23 extend between a connection point 25 to the transformer 26 and the grid connection point 4. In the example illustrated in FIG. 1, the three branch arrangements 18-20 are of identical design, but this does not generally have to be the case. The structure of the arrangements of parallel branches 18-20 and the structure of the switching module branches is discussed in more detail with reference to FIG. 2 below.

A voltage dropped across the switching branches is denoted $U_c$. The converter-side line-to-ground voltage is denoted $U_1$, and the grid-side line-to-ground voltage is accordingly denoted $U_{net}$. The branches 18-20 are used to compensate a line impedance $X_{netz}$ and/or a converter-side impedance $X_c$ and to stabilize a connection voltage $U_{prim}$ at the connection point 25 in order to guarantee stable and reliable operation of the converter arrangement 1, and in particular of the converter 2. The converter arrangement 1 for this purpose has a central actuation unit 24 that is designed to regulate the actuation of the switching module branches or to initiate the actuation of the semiconductor switches used there. The controllable transformer 26 is used to transform the connection voltage $U_{prim}$ into an output voltage $U_{sec}$ such that its amplitude is reduced.

Figure 2:
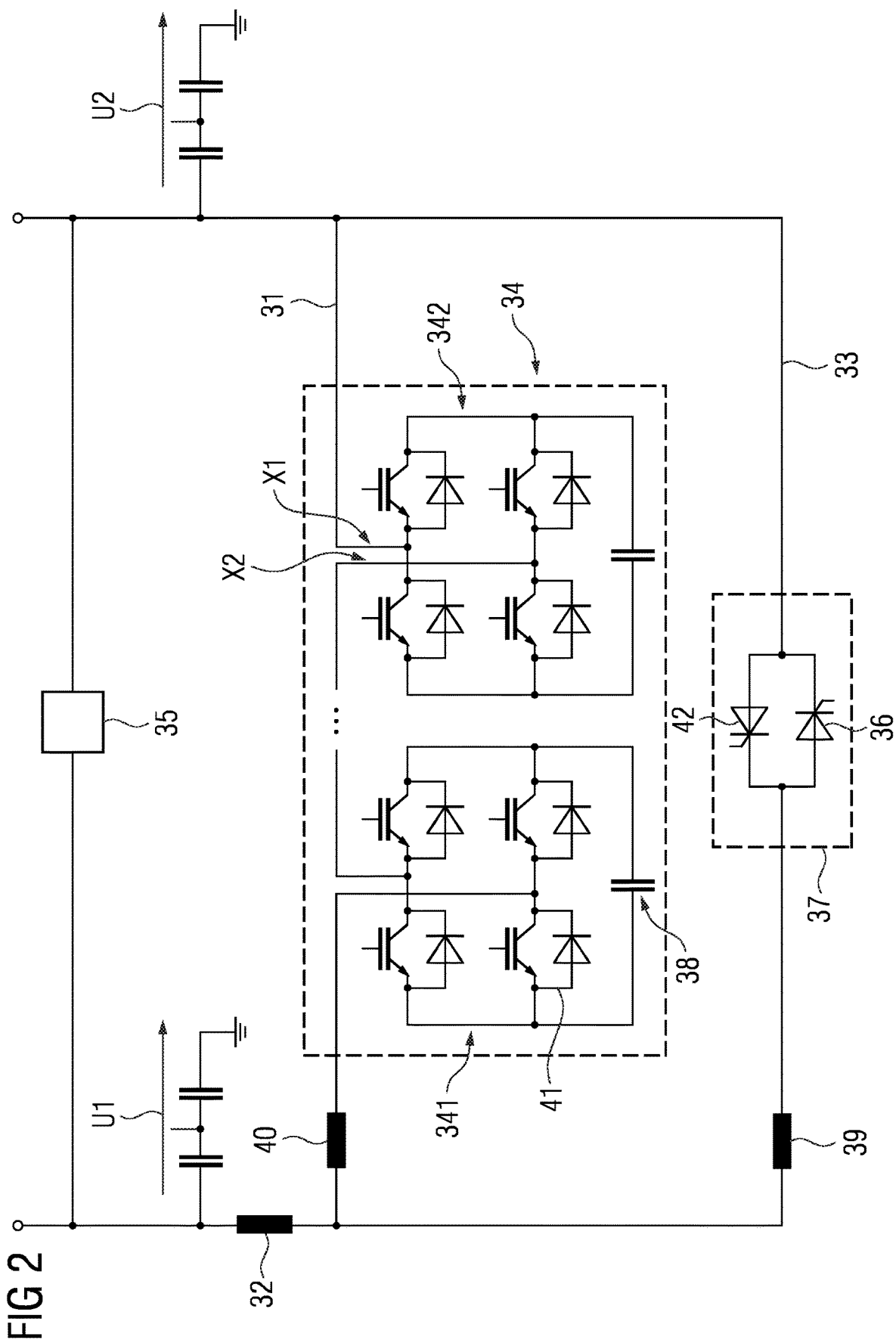
FIG. 2 shows a schematic illustration of an exemplary embodiment of an arrangement of parallel branches for a converter arrangement according to the invention.

FIG. 2 shows an arrangement of parallel branches that is able to be used as one or more of the branches 18-20 in the converter arrangement from FIG. 1. A bypass branch 33 is arranged in a parallel connection to a switching module branch 31, and a bypass switch 35 is arranged in another parallel connection. The switching module branch 31 comprises a series connection 34 of switching modules 341, 342, these being full bridge switching modules known from the prior art (the figure illustrates only two switching modules 341, 342, but the number thereof may in principle be adjusted as desired and to the respective application). Each full bridge switching module comprises its own energy storage unit 38 in the form of a storage capacitor, as well as activatable and deactivatable semiconductor switches 41 in the form of (for example) IGBTs. A freewheeling diode is in this case connected in antiparallel with each IGBT. Bipolar voltages are able to be generated at the terminals of each full bridge switching module. A first inductance 40 is furthermore arranged in the switching module branch 31.

The bypass branch 33 comprises a switching device 37. The switching device 37 has a first activatable semiconductor switch 36 in the form of a thyristor, and a second activatable semiconductor switch 42, likewise in the form of a thyristor. The forward directions of the two semiconductor switches 36 and 42 are in opposite directions. In this sense, the semiconductor switches 36 and 42 are connected in antiparallel. The bypass branch 33 furthermore comprises a second inductance 39. A further inductance of the arrangement is denoted by the reference sign 32. The difference between the voltages $U_1$ and $U_2$ corresponds to the branch voltage present on the switching module branch.

Figure 3:
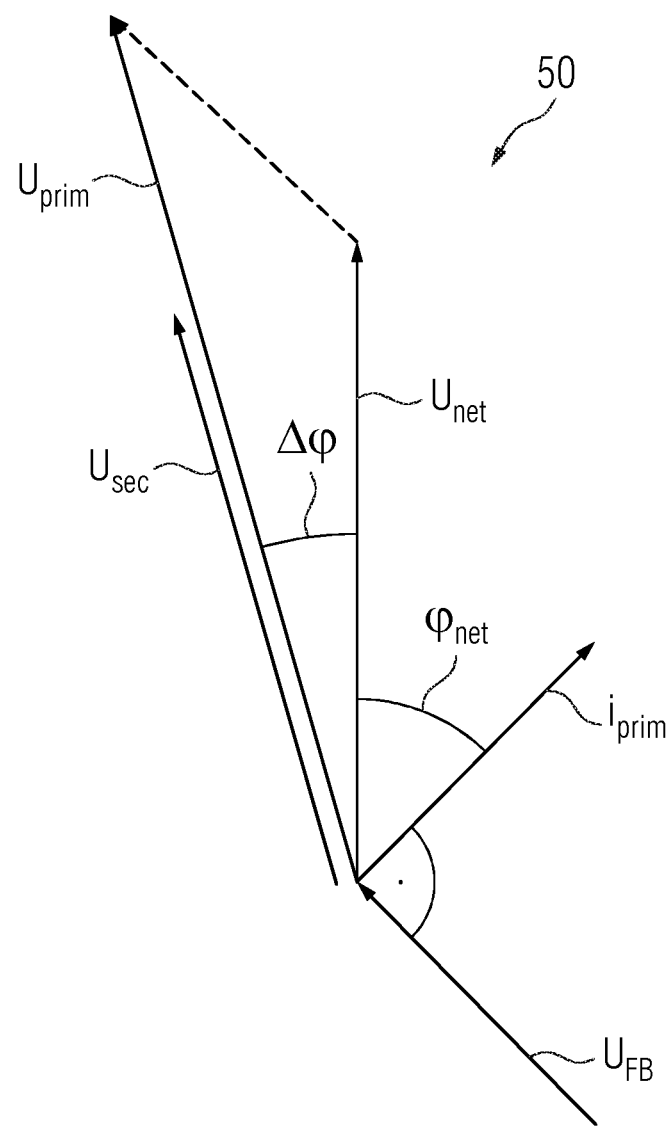
FIG. 3 shows a schematic illustration of a first vector diagram for branch current and branch voltage of a switching module branch.

FIG. 3 illustrates a vector diagram 50. The vector diagram 50 is a voltage/current diagram for the case of rectifier operation of a converter arrangement, which corresponds for example to the converter arrangement 1 of FIG. 1. The diagram 50 shows a primary-side voltage $U_{prim}$ on a primary side of a controllable transformer, for example the transformer 26 of FIG. 1, and a secondary-side voltage $U_{sec}$ on a secondary side of the transformer. The primary-side voltage $U_{prim}$ in this case corresponds to the connection voltage at the connection point between the switching module branches and the transformer. It may be seen that a branch voltage $U_{FB}$ applied to the switching module branches is phase-shifted by pi/2 in relation to a primary-side current $i_{prim}$ on the primary side of the transformer. At the same time, the primary-side current $i_{prim}$ is shifted by an angle φnet (phi$_{net}$) in relation to a line voltage $U_{net}$ of an AC voltage grid connected to the converter arrangement. It may also be seen that the primary-side voltage $U_{prim}$ consists of the line voltage $U_{net}$ and the branch voltage $U_{FB}$. The secondary-side voltage $U_{sec}$ is in phase with the primary-side voltage $U_{prim}$, but has an amplitude that is reduced (by way of the transformer). The vector diagram 50 additionally shows that the reference system of the branch current $i_{prim}$ is selected for the regulation of the branch voltage $U_{FB}$. The branch current $i_{prim}$ through the switching module branch or branches in this case corresponds to a line current $i_{net}$. In the case that is illustrated in FIG. 3, the line voltage $U_{net}$ leads the primary-side voltage $U_{prim}$ by an angle Δφ (deltaphi).

Figure 4:
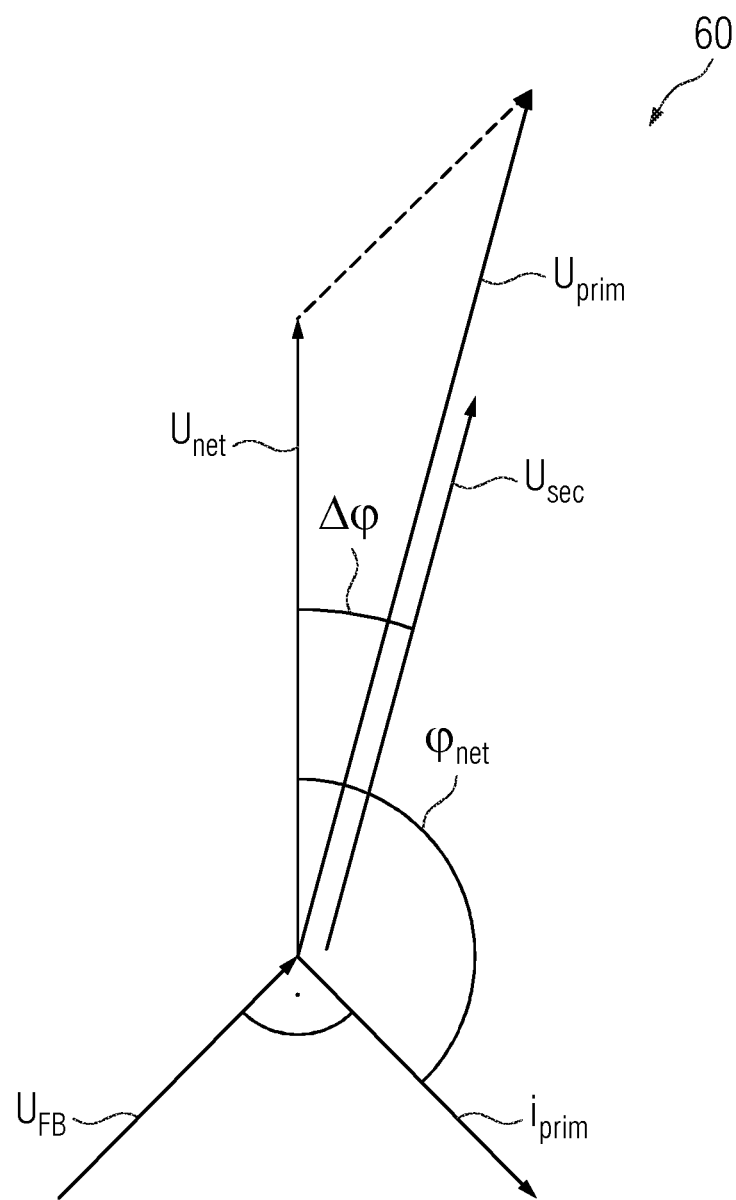
FIG. 4 shows a schematic illustration of a second vector diagram for branch current and branch voltage of a switching module branch.

FIG. 4 illustrates a vector diagram 60. The vector diagram 60 is a voltage/current diagram for the case of inverter operation of a converter arrangement, which corresponds for example to the converter arrangement 1 of FIG. 1. The diagram 60 shows a primary-side voltage $U_{prim}$ on a primary side of a controllable transformer, for example the transformer 26 of FIG. 1, and a secondary-side voltage $U_{sec}$ on a secondary side of the transformer. The primary-side voltage $U_{prim}$ in this case corresponds to the connection voltage at the connection point between the switching module branches and the transformer. It may be seen that a branch voltage $U_{FB}$ applied to the switching module branches is phase-shifted by π/2 (pi/2) in relation to a primary-side current $i_{prim}$ on the primary side of the transformer. At the same time, the primary-side current $i_{prim}$ is shifted by an angle (net in relation to a line voltage $U_{net}$ of an AC voltage grid connected to the converter arrangement. It may also be seen that the primary-side voltage $U_{prim}$ consists of the line voltage $U_{net}$ and the branch voltage $U_{FB}$. The secondary-side voltage $U_{sec}$ is in phase with the primary-side voltage $U_{prim}$, but has an amplitude that is reduced (by way of the transformer). The vector diagram 50 additionally shows that the reference system of the branch current $i_{prim}$ is selected for the regulation of the branch voltage $U_{FB}$. The branch current $i_{prim}$ through the switching module branch or branches in this case corresponds to a line current $i_{net}$. In the case illustrated in FIG. 4, the line voltage $U_{net}$ lags the primary-side voltage $U_{prim}$ by an angle Δφ.

The invention claimed is:

1. A method of starting a converter arrangement, the method comprising:
   providing a converter arrangement having:
      a line-commutated converter having an AC voltage terminal for connection to an AC voltage grid via at least one phase line;
      at least one switching module branch connected in series in the at least one phase line, the at least one switching module branch having a series connection of switching modules with terminals configured to generate bipolar voltages that sum to give a branch voltage;
      a bypass branch connected in parallel with the at least one switching module branch, the bypass branch containing at least one switching device formed with activatable semiconductor switches that are connected in an antiparallel connection;
   blocking the switching modules in the switching branch;
   activating the semiconductor switches in the bypass branch with a predetermined delay; and
   commutating a branch current from the switching branch to the bypass branch through the delayed activation of the semiconductor switches.

2. The method according to claim 1, wherein the converter has an n-phase AC voltage terminal to be connected to the AC voltage grid via n phase lines, where n is at least 2, wherein a switching module branch is arranged in series in each of the phase lines, wherein a series connection of the switching modules is arranged in each switching module branch and a respective bypass branch having a respective switching device with semiconductor switches configured to be activated in antiparallel is arranged in parallel with each of the switching module branches.

3. The method according to claim 1, wherein the switching modules are full bridge switching modules.

4. The method according to claim 1, wherein the line-commutated converter is a thyristor-based converter.

5. The method according to claim 1, wherein the converter arrangement further comprises a mechanical bypass switch connected in parallel with the switching module branch and the bypass branch.

6. The method according to claim 1, wherein the converter arrangement further comprises a first inductance arranged in the switching module branch.

7. The method according to claim 1, wherein the converter arrangement further comprises a second inductance arranged in the bypass branch connected in parallel with each the switching module branch.

8. The method according to claim 1, wherein the bypass branch has a number Ah of antiparallel semiconductor switches and a respectively associated switching module branch has a number As of switching modules, and wherein Ah⇐As⇐3*Ah.

9. The method according to claim 1, wherein the converter arrangement further comprises a central actuation unit configured to activate the semiconductor switches in the bypass branch when a predetermined condition is present.

10. The method according to claim 1, wherein the semiconductor switches in the bypass branch are configured to be activated automatically when a predetermined condition is present.

11. The method according to claim 1, wherein the converter arrangement further comprises a controllable transformer arranged between the at least one switching module branch and the converter.

12. The method according to claim 1, which comprises switching the switching modules on a basis of a switching module voltage and a current direction of the branch current, to thereby charge the energy storage units of the switching modules to a predefined voltage level.

13. The method according to claim 1, which comprises, when the semiconductor switches in the bypass branch are activated, opening a mechanical bypass switch arranged in the parallel connection to the bypass branch, to thereby commutate the branch current to the bypass branch.

* * * * *